Patented June 29, 1954

2,682,468

UNITED STATES PATENT OFFICE 2,682,468

PROCESS OF TREATING WINES

Orville D. Frampton, Wyoming, Ohio, assignor to National Distillers Products Corp., a corporation of Virginia No Drawing. Application December 13, 1950, Serial No. 200,685

3 Claims. (Cl. 99—48)

This invention relates to a process of treating wines to reduce volatile acidity and will be fully understood from the following description.

There is an upper limit to the amount of volatile acidity which can be carried in a wine, both with respect to the regulations of the Food and Drugs Act and with respect to consumer acceptance. At times a batch of finished wine, due to improper fermentation or some other cause that is not fully understood, will contain an excess of such volatile acidity. I have now found that such volatile acidity can be reduced to permissible limits by the following process:

In the first step of my process I contact the wine with a cation exchange resin of the hydrogen exchange type to substitute hydrogen for the sodium and potassium which are normally present in such wines, principally in the form of the respective tartrates. The amount of resin and the duration of contact should be coordinated to remove at least the major part of the sodium and potassium present and preferably at least 75 mol percent of the same.

In the next step of my process and after removing the wine from contact with the cation exchange resin I contact the wine so treated with an anion exchange resin of the hydroxyl exchange type. The amount of anion exchange resin and the duration of contact should be continued to remove at least the major part of the volatile acids present in the treated wine.

The end result of steps 1 and 2 is to produce a wine in which the volatile acids have been reduced to any desired extent, depending upon the duration and intensity of treatment but which may have deficiency in sodium and potassium tartrate and in free tartaric acid.

I therefore prefer to blend the wine so treated with an additional amount of untreated wine. In this case the removal of the volatile acids from treated wine is carried on to such an extent that the blend contains volatile acids only within acceptable limits and the blend will then contain tartaric acid and sodium and potassium tartrates in amount sufficient to impart to it an agreeable flavor.

In the following example a vertical glass column of 1 inch inside diameter and 44 inches in height was charged with 200 grams of a cation exchange resin of the hydrogen exchange type, specifically that sold under the trade name of Amberlite IR 120. This resin was backwashed for 10 mintues at 75% expansion and then regenerated with 770 grams of 10% hydrochloric acid at a flow rate of 25 ml./min. The final portions of rinse water gave no precipitate when treated with silver nitrate.

Six and one-half litres of wine having a total acidity of 0.63 gram per 100 ml. calculated as tartaric acid and a total volatile acidity of 0.16 gram per 100 ml. calculated as acetic acid was then passed through the resin contained in the column at a flow rate of 25 ml./min. The volatile acidity remained essentially unchanged but the total acidity calculated as tartaric acid was increased to 1.16 g./100 ml.

The IR 120 resin was then removed from the column and replaced with 200 grams of an anion exchange resin of the hydroxyl exchange type, more specifically the resin identified by the trade name Amberlite IR 4B. 814 ml. of hydrochloric acid, 2% HCl by weight, were then passed through the resin at the rate of 25 ml./min. Following this, 2 litres of distilled water were passed through followed by 6.1 litres of a 2% sodium carbonate solution. The resin was then washed with distilled water until the washing gave no pink color on the addition of phenolphthalein solution.

2800 ml. of the wine which had been treated with the IR 120 resin were then passed down through the IR 4B resin at the rate of 25 ml./min. The resulting wine had a total volatile acidity of only 0.03 gram/100 ml. calculated as acetic acid and a total acidity calculated as tartaric acidity of 0.045 gram/100 ml. A part of it was blended with equal volumes of the original wine. The blend had a total volatile acidity of 0.087 gram/100 ml. and a total acidity of 0.413 gram/100 ml. The blend was moreover of acceptable flavor.

I claim:

1. Process of treating wines containing an excess of volatile acidity to reduce such volatile acidity which comprises contacting such a wine with a resin of the hydrogen exchange type in amount sufficient to convert and converting the major part of the bound acids, calculated as tartaric, in such wine into the free acids and thereafter contacting said wine with an anion exchange resin of the hydroxyl exchange type in amount sufficient to remove and removing at least the major part of the volatile acids in such wine.

2. Process of treating wine containing an excess of volatile acidity to reduce such volatile acidity which comprises contacting such a wine with a resin of the hydrogen exchange type in amount sufficient to convert and converting at least 75 mol percent of the bound acids, calculated as tartaric, in such wine into the free acids and thereafter contacting such wine with an anion exchange resin of the hydroxyl exchange type in amount sufficient to remove and removing at least the major part of the volatile acids in such wine.

3. Process of treating wines containing an excess of volatile acidity to reduce such volatile acidity which comprises contacting such a wine with a resin of the hydrogen exchange type in amount sufficient to convert and converting the major part of the bound acids, calculated as tartaric, in such wine into the free acids and thereafter contacting said wine with an anion exchange resin of the hydroxyl exchange type in amount sufficient to remove and removing at least the major part of the volatile acids in such wine, and thereafter blending the wine so treated with an additional amount of untreated wine in proportion to produce a blend having a relatively low volatile acidity and acceptable flavor.

References Cited in the file of this patent

UNITED STATES PATENTS

| Number | Name | Date |
|---|---|---|
| 2,097,545 | Bowden et al. | Nov. 2, 1937 |
| 2,258,216 | Ramage | Oct. 7, 1941 |
| 2,372,233 | Thurston | Mar. 27, 1945 |
| 2,404,367 | Durant et al. | July 23, 1946 |
| 2,419,628 | Cohen | Apr. 29, 1947 |
| 2,500,171 | Gause | Mar. 14, 1950 |
| 2,520,189 | Zarow | Aug. 29, 1950 |
| 2,600,085 | Van Dyk | June 10, 1952 |